United States Patent Office 2,756,265
Patented July 24, 1956

2,756,265

ALKYLATED POLYSTYRENE POUR DEPRESSANTS

William C. Hollyday, Jr., Fanwood, N. J., assignor to Esso Research and Engineering Company, a corporation of Delaware No Drawing. Application October 21, 1953, Serial No. 387,520

8 Claims. (Cl. 260—671)

This invention relates to improved pour point depressants and to the process for their prepaartion. Particularly the invention relates to an improved process for the alkylation of polystyrene to form lubricant additive materials having outstanding pour depressing activity. More particularly the invention relates to a process for the alkylation of polystyrene, the alkylation being accomplished in the presence of a Friedel-Crafts catalyst and a critical amount of nitrobenzene as a catalyst modifier.

It has long been known in the art of lubricating oil additive manuafacture that alkylated polystyrene has many desirable characteristics as a lubricant additive material. It is also known and described in the literature that the alkylation of polystyrene is most advantageously carried out in the presence of a Friedel-Crafts type catalyst. Some of the patent literature discloses the use of catalyst modifiers among which have been disclosed the use of nitrobenzene. In British Patent No. 640,566, sealed July 26, 1950, there is disclosed that polystyrene may be alkylated with various alkylating agents using as catalyst aluminum chloride in the presence of an organic nitro compound which is soluble in the alkylation mixture. It is also taught in this patent that the organic nitro compound may be used in any proportions relatively small amounts being effective and larger proportions being without any apparent harmful influence upon the reaction.

It has now been found, and it forms the object of this invention, that when an alkylated polystyrene is being prepared for use as a pour depressor, using a Friedel-Crafts alkylation process, there exists a critical ratio of nitrobenzene to the catalyst used. When alkylated polystyrene materials are prepared using ratios of nitrobenzene to Friedel-Crafts catalyst outside this critical ratio, products having pour depressing potencies of lesser magnitudes are obtained.

It has been found that the most active alkylated polystyrene pour depressants are prepared under conditions such that $$CT = K(1+R)^2$$

where C is the weight ratio of aluminum chloride to polystyrene, T is the temperature in °F., R is the ratio of mols of catalyst modifier to mols of aluminum chloride, and K has a value within a range of from 6 to 15.

As far as is known, this equation has no theoretical basis but it does express the fact that the larger the amount of catalyst used, or the higher the temperature, the more catalyst modifier will be required for maximum activity. It is especially applicable in the range of catalyst concentration from 5% to 25%, preferably 10% to 20%, and at temperatures from 50° to 200° F., preferably 80° to 125° F.

Although the exact mechanism whereby this phenomenon occurs is not known, it is postulated that when amounts of nitrobenzene below the critical range are used, the aluminum chloride catalyst is sufficiently active so as to cause undesirable polymer chain breakdown and isomerization, resulting in low activity. If the amount of aluminum chloride is correspondingly decreased, then the time of reaction to obtain the desired product is increased and smaller yields are obtained, or undesirable cross linkage and gelation of the reaction mixture result. On the other hand, when amounts of nitrobenzene above the critical range are used, the Friedel-Crafts catalyst is thereby correspondingly decreased in activity and reaction times are increased with a decrease in yield. When more aluminum chloride is used to overcome this effect, polymer breakdown occurs with resultant low activity. When, however, the optimum ratio of nitrobenzene and the Friedel-Crafts catalyst is used in the alkylation procedure, maximum yield of a more potent product is obtained in the minimum reaction time. It is believed that this is the first teaching of this economically important concept in the art of polystyrene alkylation technique.

Broadly, the improved process of this invention comprises the steps of dissolving the desired polystyrene in an inert solvent and heating the mixture until the polystyrene is completely in solution. The mixture is then cooled to the desired reaction temperature at which time the nitrobenzene and the Friedel-Crafts catalyst is added. The alkylating agent is then added dropwise and the reaction temperature selected is maintained by cooling or heating as necessary. After the completion of the reaction, the alkylates are purified by well known techniques, among which is precipitation with methanol, dissolving in hexane and reprecipitating several times with methanol or isopropanol. If desired, the alkylated material may be dissolved in oil, washed with alkaline solutions, and the oil solution then steam stripped to result in the final product.

For obtaining the superior pour point depressants of this invention, it is desired that the polystyrene starting material have an intrinsic viscosity within a range of about 0.2 to 1.0, preferably 0.8 to 1.0. These viscosities correspond to molecular weights within a range of from about 10,000 to 75,000, preferably 30,000 to 60,000 Staudinger. Since the amounts of the other reactants are based on the weight of the polystyrene, the amount of polystyrene used will depend upon restrictions such as equipment capacity, etc.

The alkylation agent chosen for the preparation of the improved pour point depressants of this invention will be olefinic in nature and will preferably contain from 16 to 20 carbon atoms in a straight chain. Although octadecene-1, hexadecene-1, and cracked wax are used in the examples specifically detailing the instant invention, any olefinic material having the above requirements may be used. It is preferred that equimolar quantities of polystyrene and the alkylating agent be used, however, from 0.80 to 2.00 mols of alkylation agent per mol equivalent of polystyrene is operable.

Chlorinated aromatic solvents have been found to be more suitable than chlorinated aliphatic solvents for the process of this invention. It is believed that this is due to the fact that the aliphatic compounds enter into the alkylation reaction to a greater extent than do the aromatic compounds. In the case of a bifunctional aliphatic compound such as ethylene dichloride, gelled reaction mixtures are produced, presumably because of the cross linking experienced. It has been found that o-dichlorobenzene is preferable to mono-chlorobenzene in that the products are more active. Dichlorobenzene may, in some instances, give more viscous reaction mixtures while mono-chlorobenzene is ordinarily free of this objection. Although the patent literature states that nitrobenzene may be used as a solvent for the alkylation reactions, it is found that in the process of the instant invention the use of nitrobenzene alone results in products having very low pour depressing activity or in gel formation during the reaction. The effects of some of the common solvents are tabulated below.

TABLE I

| Solvent | Comments, Effect on Alkylation of Polystyrene |
|---|---|
| O-Dichlorobenzene | Suitable, some tendency toward gelation except under critical reaction conditions. |
| Monochlorobenzene | Less gelation than with o-dichlorobenzene but products are of lower activity. |
| Ethylene Dichloride | Great tendency toward gelation, products of low activity. |
| Tetrachloroethylene | Suitable, some tendency toward gelation. |
| Carbon Disulfide | Tends to gel. |
| Nitrobenzene | Products of very low activity when present as only solvent. Excellent reaction modifier in smaller amounts. |

Although the preferred embodiment of this invention contemplates the use of anhydrous aluminum chloride as the Friedel-Crafts catalyst, any of the well known Friedel-Crafts catalysts may be used. A list of those catalysts operable would include $AlCl_3$, $AlBr_3$, $AlBr_2Cl$, $AlClBr_2$, $Al_2Br_5Cl$, $AlBr_2OH \cdot AlBr_3$, $AlIBr_2BF_2$, and the like.

As was mentioned above, when the catalyst concentration is too low, the reaction requires a longer time to go to completion or, stated in another way, the conversion in a suitable reaction time is so low that the yields and activity are low. When the catalyst concentration is too high, extensive polymer breakdown and isomerization occurs, thus leading to low activity. Suitable catalyst concentrations lie in the range of 5% to 25%, preferably in the range of 10% to 20%, percentages being by weight, based on the weight of the polystyrene. In the preferred embodiment from 10% to 20% of an aluminum chloride catalyst is used.

It will be noted from the data in Tables II and IV below that reaction temperatures in the range of 80° to 125° F. have no pronounced effect on the activity of the alkylated polystyrene pour depressants of this invention. It is known that very active alkylates can be made at temperatures as low as —50° F. but at this temperature a large amount of catalyst is required (100% based upon the polystyrene) and the refrigeration required to maintain the temperature on a plant scale is extensive. Alkylates made at 200° F. have lowered pour depressant activity, presumably because at this temperature extensive isomerization occurs. In the preferred embodiment of this invention, reaction temperatures within the range of from 50° to 200° F., preferably 80° to 125° F., are used.

TABLE II

Effect of temperature [1]

| Example Number | Temp., °F. | Intrinsic Viscosity of Product | Yield, percent | ASTM Pour Point, °F. of Mid-Continent SAE 20 Blends @ wt. percent | | | Relative Activity [2] |
|---|---|---|---|---|---|---|---|
| | | | | .010 | .015 | .020 | |
| 17 | 80 | 0.406 | 90 | −10 | −20 | −30 | −60 |
| 8 | 100 | 0.221 | 91 | −15 | −25 | −30 | −70 |
| 9 | 100 | 0.256 | 87 | −20 | −25 | −30 | −75 |
| 24 | 150 | 0.227 | 96 | 0 | 0 | −10 | −10 |

[1] Reaction conditions—charge in order: 200 ml. o-dichlorobenzene, 100 g. polystyrene (intrinsic viscosity 0.965) heat to dissolve, cool, add 15 g. aluminum chloride and 5.5 g. nitrobenzene, add 242 g. octadecene over 1 hour, maintaining reaction temperature (T) given for 6 hours. C=0.15, R=0.40.
[2] Algebraic sum of pour points. The lower this value, the more active is the product as a pour depressant.

In preparing the copolymers of the process of this invention, polystyrene was dissolved in a solvent by heating the mixture to the reaction temperature, and anhydrous aluminum chloride and nitrobenzene, if used, were added. The alkylation agent was then added dropwise over a period of from one to two hours and the reaction temperature was maintained by cooling or heating. The reaction was allowed to proceed for a total of about six hours and the alkylates were purified by precipitation with methanol, dissolving in hexane and reprecipitating several times with methanol and isopropanol.

The alkylates obtained were tested for pour depressing activity in conventionally refined Mid-Continent lubricating oil stocks of SAE 10, 20, and 30 grades, and the data are set out in Tables III and IV below. Comparative data on two commercially available pour point depressants were included in Table III.

TABLE III

Effect of nitrobenzene on alkylation of polystyrene [1]

| Ex. No. | Percent $AlCl_3$ [2] (C) | Mols $C_6H_5NO_2$ 1 Mol $AlCl_3$ (R) | $\dfrac{K^{[3]}}{CT(1+R)^2}$ | Intrinsic Viscosity of Product | Yield Percent [4] | ASTM Pour Point, °F., of Mid-Continent Blends [5] | | | | | | | | | Relative Activity [6] |
|---|---|---|---|---|---|---|---|---|---|---|---|---|---|---|---|
| | | | | | | Wt. Percent in SAE 10 | | | Wt. Percent in SAE 20 | | | Wt. Percent in SAE 30 | | | |
| | | | | | | .010 | .015 | .020 | .010 | .015 | .020 | .010 | .015 | .020 | |
| 1 | 10 | 0.00 | 10.0 | 0.139 | 97 | −15 | −15 | −25 | −5 | −15 | −20 | +10 | 0 | −5 | −90 |
| 2 | 10 | 0.17 | 7.36 | 0.241 | 97 | −15 | −30 | −30 | −10 | −15 | −25 | −5 | −5 | −10 | −145 |
| 3 | 10 | 0.26 | 6.27 | 0.473 | 98 | −15 | −20 | −25 | −5 | −10 | −25 | +10 | 0 | −10 | −100 |
| 4 | 10 | 0.41 | 5.04 | 0.690 | 83 | 0 | −5 | −5 | +10 | +10 | +5 | +10 | +10 | +5 | +40 |
| 5 | 10 | 1.00 | 2.50 | 0.848 | 55 | +10 | +10 | +10 | +15 | +10 | +10 | +15 | +15 | +10 | +105 |
| 6 | 15 | 0.00 | 15.0 | 0.125 | 94 | −20 | −25 | −30 | −5 | −15 | −20 | +15 | −10 | −15 | −125 |
| 7 | 15 | 0.30 | 8.85 | 0.209 | 96 | −15 | −20 | −25 | −10 | −15 | −20 | 0 | −10 | −10 | −135 |
| 8 | 15 | 0.40 | 7.64 | 0.221 | 91 | −20 | −20 | −25 | −15 | −25 | −30 | 0 | −10 | −15 | −160 |
| 9 | 15 | 0.40 | 7.64 | 0.256 | 87 | −20 | −25 | −25 | −20 | −25 | −30 | +5 | 0 | −5 | −145 |
| 10 | 15 | 0.66 | 5.42 | Gel | | | | | | | | | | | |
| 11 | 15 | 1.00 | 3.50 | Gel | | | | | | | | | | | |
| 12 | 20 | 0.00 | 20.0 | 0.057 | 98 | 0 | −5 | −10 | +10 | 0 | −5 | +15 | +10 | +5 | +20 |
| 13 | 20 | 0.39 | 10.37 | 0.098 | 95 | −15 | −20 | −25 | −5 | −15 | −20 | +10 | +5 | −5 | −90 |
| 14 | 20 | 0.53 | 8.56 | 0.191 | 96 | −10 | −15 | −20 | 0 | −10 | −15 | +5 | 0 | −5 | −70 |
| 15 | 20 | 0.71 | 6.84 | 0.196 | 98 | −15 | −25 | −25 | −10 | −15 | −20 | −5 | −5 | −5 | −125 |
| 16 | 20 | 1.00 | 5.00 | Gel | | | | | | | | | | | |
| Commercial Naphthalene-Chlorowax Pour Depressant | | | | | | +5 | 0 | −10 | +5 | +5 | 0 | +10 | +10 | +5 | +30 |
| Commercial Acrylic Ester Polymer Pour Depressant | | | | | | −10 | −15 | −25 | −10 | −20 | −25 | −10 | −15 | −20 | −150 |

[1] Reaction conditions—charge in order: 200 ml. o-dichlorobenzene, 100 g. polystyrene intrinsic viscosity 0.965, heat to dissolve, cool, add aluminum chloride and nitrobenzene if used, add 242 g. octadecene over 1 hour, maintaining reaction temperature (T) of 100 F. for 6 hours.
[2] Based on polystyrene.
[3] C=percent aluminum chloride, T=temperature ° F., R=mols $C_6H_5NO_2$ per mol alum. chloride.
[4] Alcohol insoluble, hexane soluble product. Theoretical yield 342 g.
[5] Pour points of base stocks: SAE 10, +10; SAE 20, +15; SAE 30, +15° F.
[6] These values are the algebraic sums of the pour points of the nine oil blends of each product. The lower the value the more active is the product as a pour depressant.

In Table III above there is set out the results of 16 experiments wherein a percentage of aluminum chloride is varied between 10% and 20% with a mol ratio of nitrobenzene to aluminum chloride being varied between 0.0 and 1.0. The pour depressing data obtained by the standard ASTM pour point determination tests point out clearly that mol ratios of nitrobenzene to catalyst between 0.2 to 0.8, or K values between 6 and 15, result in alkylates having maximum pour point depressing potency.

In Experiments 17 through 20 reported in Table IV above the mol ratio of nitrobenzene to aluminum chloride was varied slightly, that is from 0.40 to 0.46, the reaction temperature was held constant, and the percentage aluminum chloride was varied slightly. Active pour point depression was obtained using these reaction conditions, K values varying between 6.14 and 6.78. In Experiments 21 through 24 the value of K was raised to 8.55 to 11.42 by increasing the temperature to 125° F. to 150° F. The percentage of aluminum chloride varied between 12 and 15 and the mol ratio of nitrobenzene to aluminum chloride varied between 0.3 and 0.5. Under these conditions potent alkylates were obtained. In Experiments 25 through 27 various olefins were used, that is, namely, octadecene, hexadecene, and cracked wax olefins. Mol ratios of nitrobenzene to aluminum chloride varied between 1.0 and 0.4. Excellent pour point depressants were obtained.

TABLE V

*Effect of reaction conditions on pour depressant activity* [1]

| Ex. No. | Percent AlCl$_3$ (C) | Temp., °F. (T) | Mols C$_6$H$_5$NO$_2$ 1 mol AlCl$_3$ (R) | K = $\frac{CT}{(1+R)^2}$ | Relative Activity [2] | Intrinsic Viscosity of Product |
|---|---|---|---|---|---|---|
| 12 | 20 | 100 | 0.00 | 20.0 | +20 | 0.057 |
| 6  | 15 | 100 | 0.00 | 15.0 | −125 | 0.125 |
| 24 | 15 | 150 | 0.40 | 11.42 | −25 | 0.227 |
| 13 | 20 | 100 | 0.39 | 10.37 | −90 | 0.098 |
| 1  | 10 | 100 | 0.00 | 10.0 | −90 | 0.139 |
| 7  | 15 | 100 | 0.30 | 8.85 | −135 | 0.209 |
| 14 | 20 | 100 | 0.53 | 8.65 | −70 | 0.191 |
| 21 | 12 | 125 | 0.32 | 8.55 | −110 | 0.491 |
| 22 | 15 | 125 | 0.54 | 7.92 | −70 | 0.360 |
| 8  | 15 | 100 | 0.40 | 7.64 | −160 | 0.221 |
| 9  | 15 | 100 | 0.40 | 7.64 | −145 | 0.256 |
| 2  | 10 | 100 | .17 | 7.36 | −145 | 0.241 |
| 15 | 20 | 100 | 0.71 | 6.84 | −125 | 0.196 |
| 19 | 18 | 80 | .46 | 6.78 | −105 | 0.462 |
| 3  | 10 | 100 | .26 | 6.27 | −100 | 0.473 |
| 17 | 15 | 80 | .40 | 6.14 | −115 | 0.406 |
| 10 | 15 | 100 | .66 | 5.42 | Gel | Gel |
| 4  | 10 | 100 | .41 | 5.04 | +40 | 0.690 |
| 16 | 20 | 100 | 1.00 | 5.00 | Gel | Gel |
| 11 | 15 | 100 | 1.00 | 3.50 | Gel | Gel |
| 5  | 10 | 100 | 1.00 | 2.50 | +105 | 0.848 |

[1] Reaction conditions—charge in order: 200 ml. o-dichlorobenzene, 100 g. polystyrene intrinsic viscosity 0.965, heat to dissolve, cool, add aluminum chloride and nitrobenzene if used, add 242 g. octadecene over 1 hour, maintaining reaction temperature (T) of 100° F. for 6 hours.
[2] The lower this value the more active is the product as a pour depressant. See Table III for explanation.

TABLE IV

*Miscellaneous experiments*

(A) REACTION CONDITIONS AS GIVEN FOR TABLE I EXCEPT AS NOTED BELOW [1]

| Ex. No. | Percent AlCl$_3$ [1] (C) | °F. (T) | Mols C$_6$H$_5$NO$_2$ 1 mol AlCl$_3$ | K [1] $\frac{CT}{(1+R)^2}$ | Time, hrs. | Intrinsic Viscosity of Product | Yield Percent [1] | ASTM Pour Point, °F., of Mid-Continent Blends [1] | | | | | | | | | Relative Activity [1] |
|---|---|---|---|---|---|---|---|---|---|---|---|---|---|---|---|---|---|
| | | | | | | | | Wt. Percent in SAE 10 | | | Wt. Percent in SAE 20 | | | Wt. Percent in SAE 30 | | | |
| | | | | | | | | .010 | .015 | .020 | .010 | .015 | .020 | .010 | .015 | .020 | |
| 17 | 15 | 80 | 0.40 | 6.14 | 6 | 0.406 | 90 | −5 | −20 | −25 | −10 | −20 | −30 | +5 | 0 | −10 | −115 |
| 18 | 15 | 80 | 0.40 | 6.14 | 20 | 0.323 | 97 | −10 | −20 | −30 | −10 | −25 | −25 | +10 | +5 | −10 | −115 |
| 19 | 18 | 80 | 0.46 | 6.78 | 6 | 0.462 | 90 | −10 | −20 | −20 | −10 | −10 | −25 | 0 | −5 | −5 | −105 |
| 20 | 18 | 80 | 0.46 | 6.78 | 20 | 0.343 | 91 | −10 | −25 | −25 | −10 | −15 | −20 | 0 | −5 | −10 | −120 |
| 21 | 12 | 125 | 0.32 | 8.55 | 6 | 0.491 | 94 | −15 | −20 | −25 | −10 | −10 | −15 | 0 | −5 | −10 | −110 |
| 22 | 15 | 125 | 0.54 | 7.92 | 6 | 0.360 | 99 | −10 | −15 | −15 | 0 | −10 | −20 | +5 | 0 | −5 | −70 |
| 23 | 15 | 150 | 0.40 | 11.42 | 3 | 0.223 | 91 | −10 | −20 | −25 | −5 | −15 | −20 | +10 | +5 | 0 | −80 |
| 24 | 15 | 150 | 0.40 | 11.42 | 6 | 0.227 | 96 | −5 | −15 | −25 | 0 | 0 | −10 | +15 | +10 | +5 | −25 |

(B) REACTION CONDITIONS AS GIVEN FOR TABLE I EXCEPT FOR DIFFERENT POLYSTYRENE OR OLEFIN AS NOTED BELOW [1]

| Ex. No. | Intrinsic Viscosity of Polystyrene | Source of Olefin | Percent AlCl$_3$ [1] | °F. | Mols C$_6$H$_5$NO$_2$ 1 mol AlCl$_3$ | Intrinsic Viscosity of Product | Yield Percent [1] | ASTM Pour Point, °F., of Mid-Continent Blends [1] | | | | | | | | |
|---|---|---|---|---|---|---|---|---|---|---|---|---|---|---|---|---|
| | | | | | | | | Wt. Percent in SAE 10 | | | Wt. Percent in SAE 20 | | | Wt. Percent in SAE 30 | | |
| | | | | | | | | .010 | .015 | .020 | .010 | .015 | .020 | .010 | .015 | .020 |
| 25 | 0.241 | Octadecene | 10 | 125 | 1.00 | 0.211 | 91 | −15 | −25 | −40 | −5 | −15 | −35 | +10 | −10 | −30 |
| 26 | 0.965 | Hexadecene | 15 | 100 | 0.40 | 0.351 | 96 | +5 | 0 | −25 | 0 | −5 | −20 | +10 | +10 | −10 |
| 27 | 0.120 | Cracked Wax | 15 | 100 | 0.40 | 0.154 | 84 | +5 | −5 | −40 | +15 | +10 | −30 | +15 | +10 | −15 |

[1] Reaction conditions—charge in order: 200 ml. o-dichlorobenzene, 100 g. polystyrene intrinsic viscosity 0.965, heat to dissolve, cool, add aluminum chloride and nitrobenzene if used, add 242 g. octadecene over 1 hour, maintaining reaction temperature (T) of 100° F. for 6 hours. See footnotes to Table III.

In the above table the experimental data reported in Tables III and IV are arranged according to K values, the most active products, it will be noted, were produced at K values between 6 and 15. It will also be noted that at K values of 5.5 or less the product tended to be high in intrinsic viscosity.

As was explained above it is preferred to utilize as a solvent in this invention a chlorinated aromatic solvent. In Experiments 28 through 32 using monochlorobenzene as the solvent and using mol ratios of nitrobenzene to aluminum chloride from 0.31 to 1.00, products having good pour point depressing potency were obtained. This is set out in detail in Table VI below.

able reaction conditions are so adjusted that in the relationship $$K = \frac{CT}{(1+R)^2}$$

K varies between 6.0 and 15, where C equals the weight ratio of catalyst to polystyrene, T is the temperature ° F., and R is the ratio of mols of catalyst modifier to mols of aluminum chloride. By this particular process advantageous yields of an alkylated polystyrene pour depressant having an overall activity in a wide range of lubricating oils may be obtained.

The instant application is a continuation-in-part of

TABLE VI

*Use of monochlorobenzene as the solvent [1]*

| Example Number | Mols $C_6H_5NO_2$ 1 Mol $AlCl_3$ | Intrinsic Viscosity of Product | Yield, Percent [2] | ASTM Pour Point, °F., of Mid-Continent Blends [2] | | | | | | | | | Relative Activity [2] |
|---|---|---|---|---|---|---|---|---|---|---|---|---|---|
| | | | | Wt. % in SAE 10 | | | Wt. % in SAE 20 | | | Wt. % in SAE 30 | | | |
| | | | | .010 | .015 | .020 | .010 | .015 | .020 | .010 | .015 | .020 | |
| 28 | 0.31 | 0.130 | 96 | −15 | −15 | −20 | 0 | −10 | −20 | +10 | +5 | 0 | −55 |
| 29 | 0.40 | 0.185 | 86 | −15 | −15 | −25 | −10 | −15 | −15 | +5 | 0 | −10 | −100 |
| 30 | 0.54 | 0.302 | 95 | −10 | −20 | −25 | −5 | −10 | −25 | +5 | +5 | 0 | −85 |
| 31 | 0.66 | 0.396 | 84 | −15 | −20 | −25 | 0 | −15 | −20 | −5 | −5 | −10 | −115 |
| 32 | 1.00 | 1.098 | 86 | −10 | −15 | −20 | 0 | −10 | −10 | +5 | 0 | −5 | −65 |

[1] Reaction conditions—monochlorobenzene as solvent, 15% aluminum chloride as catalyst (based on polystyrene), temperature 100° F.
[2] See footnotes to Table III.

Although nitrobenzene is the preferred catalyst modifier in the process of this invention an aliphatic nitro compound exemplified by nitromethane can be used. In Examples 33 to 35 below using mol ratios of nitromethane to aluminum chloride of from .3 to .5, products having pour depressing potency were obtained. This is brought out more in detail in Table VII below.

Serial No. 237,679, filed July 19, 1951, now abandoned, for the same inventor.

What is claimed is:

1. A process for the formation of alkylated polystyrene pour point depressors which comprises the steps of dissolving a polystyrene having an intrinsic viscosity within a range of from 0.2 to 1.0 in a solvent, adding to the solu-

TABLE VII

*Use of nitromethane as modifier [1]*

| Ex. No. | Mols $CH_3NO_2$ 1 Mol $AlCl_3$ | Intrinsic Viscosity of Prod. | Yield, Percent | ASTM Pour Pt., °F., of Mid-Continent SAE 20 Blends | | | Relative Activity [2] |
|---|---|---|---|---|---|---|---|
| | | | | .010 | .015 | .020 | |
| 33 | 0.30 | 0.132 | 94 | −5 | −15 | −20 | −40 |
| 34 | 0.41 | 0.150 | 91 | −5 | −20 | −25 | −50 |
| 35 | 0.50 | 0.212 | 91 | 0 | −15 | −25 | −40 |

[1] Reaction conditions—see footnotes to Table III. 15% $AlCl_3$ as catalyst, temperature 100° F.
[2] In SAE 20 base stock. The lower this value the more active is the product as a pour depressant.

To summarize briefly this invention has as its object an improved process for the preparation of pour point depressants. These depressants are formed by the alkylation of polystyrene using as a catalyst modifier a critical ratio of nitrobenzene to catalyst under closely controlled reaction conditions. The process involves generally the use of polystyrene having a molecular weight within a range of from 10,000 to 75,000, preferably 30,000 to 60,000 Staudinger. These molecular weights correspond to intrinsic viscosities within a range of from 0.2 to 2.0, preferably 0.8 to 1.0. The alkylating agent contemplated contains 16 to 20 carbon atoms in a straight chain. A chlorinated aromatic hydrocarbon is used as a solvent and a Friedel-Crafts catalyst in amounts varying between 10% and 20% by weight based on the weight of the polystyrene. The preferred catalyst modifier, nitrobenzene, is present in amounts so that the mol ratio of nitrobenzene to the catalyst is from 0.2 to 0.8. Reaction temperatures within a range of from 80° F. to 150° F. are used. These oper- tion from 10.0% to 25.0% by weight, based on the weight of the polystyrene, of a Friedel-Crafts catalyst and sufficient nitrobenzene so that the mol ratio of said nitrobenzene to said catalyst is within a range of from 0.2 to 0.8, adding to said mixture an aliphatic olefinic hydrocarbon having from 16 to 20 carbon atoms per molecule, maintaining the temperature of the reaction between 80° F. and 150° F. for the desired period of time, the temperature, the percentage of catalyst, and the mol ratio of nitrobenzene to catalyst being so controlled that the relationship $$\frac{CT}{(1+R)^2}$$

is equal to a number between about 6 and 15, C being the weight ratio of the catalyst to polystyrene, T the temperature in °F., and R being the mol ratio of nitrobenzene to catalyst, and recovering from the process an alkylated polystyrene having pour depressing potency.

2. A process according to claim 1 wherein equal molar proportions of said olefin and said polystyrene are admixed.

3. A process according to claim 1 wherein said solvent for the polystyrene is the monochlorobenzene and wherein said Friedel-Crafts catalyst is aluminum chloride.

4. An improved process for the preparation of lubricating oil additive materials having the desirable characteristic of improving the pour point of lubricating oils into which it has been incorporated which comprises the steps of alkylation of polystyrene of a molecular weight of within a range of from 25,000 to 45,000 with an aliphatic olefinic hydrocarbon having a carbon chain length of from 16 to 20 carbon atoms in the presence of from 10% to 25% by weight, based on the weight of the polystyrene, of a Friedel-Crafts catalyst, and nitrobenzene in an amount such that the mol ratio of the nitrobenzene to the catalyst is within a range of from 0.2 to 0.8 at a temperature of from 80° F. to 150° F. for the desired period of time, the percentage of catalyst, the temperature and the mol ratio of nitrobenzene to catalyst being so controlled that the relationship $$\frac{CT}{(1+R)^2}$$

is equal to a number between about 6 and 15, C being the weight ratio of catalyst to polystyrene, T the temperature in °F., and R the mol ratio of nitrobenzene to catalyst, and recovering from the reaction mixture the desired alkylated polystyrene.

5. An improved process for the preparation of lubricating oil additive materials having the desirable characteristic of improving the pour point of lubricating oils into which it has been incorporated which comprises the steps of dissolving polystyrene of a molecular weight within a range of from 25,000 to 45,000 in an inert chlorinated aromatic hydrocarbon solvent, adding thereto from 8% to 25% by weight, based on the weight of the polystyrene, of a Friedel-Crafts catalyst and nitrobenzene in an amount such that the mol ratio of nitrobenzene to catalyst will be between 0.2 to 0.8, adding to the mixture the desired amount of a long chain olefinic hydrocarbon material having from 16 to 20 carbon atoms per molecule, maintaining the temperature of the reaction mixture at one within the range of from 80° F. to 150° F. for the desired period of time, the percentage of catalyst, the temperature and the mol ratio of nitrobenzene to catalyst being so controlled that the relationship $$\frac{CT}{(1+R)^2}$$

is equal to a number between about 6 and 15, C being the weight ratio of catalyst to polystyrene, T the temperature in °F., and R the mole ratio of nitrobenzene to catalyst, and separating from the reaction mixture an alkylated polystyrene having improved pour point depressant properties.

6. An improved process for the preparation of lubricating oil additive materials having the desirable characteristic of improving the pour point of lubricating oils into which it has been incorporated which comprises the steps of dissolving polystyrene of a molecular weight within a range of from 20,000 to 40,000 in o-dichlorobenzene, adding thereto a mixture of from 12% to 18% by weight, based on the weight of the polystyrene, of a Friedel-Crafts catalyst and nitrobenzene, the amount of nitrobenzene being such that the molar ratio of nitrobenzene to catalyst is between 0.2 and 0.8, adding to the mixture an equimolar proportion, based on the mol equivalent of the polystyrene, of a straight chain olefinic hydrocarbon material having from 16 to 20 carbon atoms per molecule, maintaining the temperature of the reaction mixture at about 95° F. to 105° F. for the desired period of time, the percentage of catalyst, the temperature and the mol ratio of nitrobenzene to catalyst being so controlled that the relationship $$\frac{CT}{(1+R)^2}$$

is equal to a number between about 6 and 15, C being the weight ratio of catalyst to polystyrene, T the temperature in °F., and R the mol ratio of nitrobenzene to catalyst, and separating from the reaction mixture an alkylated polystyrene having improved pour point depressing properties.

7. An improved process for the preparation of lubricating oil additive materials having the desirable characteristic of improving the pour point of lubricating oils into which it has been incorporated which comprises the steps of dissolving polystyrene having a molecular weight of about 30,000 in o-dichlorobenzene, adding thereto a mixture of about 15% by weight, based on the weight of the polystyrene, of anhydrous aluminum chloride and sufficient nitrobenzene so that the mol ratio of nitrobenzene to catalyst in the mixture is between 0.2 and 0.8, adding to the mixture an equimolar proportion, based on the mol equivalent of polystyrene, of octadecene-1, maintaining the temperature of the reaction mixture at about 95° F. to 105° F. for about 6 hours, the percentage of catalyst, the temperature and the mol ratio of nitrobenzene to catalyst being so controlled that the relationship $$\frac{CT}{(1+R)^2}$$

is equal to a number between about 6 and 15, C being the weight ratio of catalyst to polystyrene, T the temperature in °F., and R the mol ratio of nitrobenzene to catalyst, and separating from the reaction mixture an alkylated polystyrene having improved pour depressing properties.

8. A process according to claim 7 wherein the mol ratio of nitrobenzene to aluminum chloride is 0.4.

References Cited in the file of this patent

UNITED STATES PATENTS

| 2,572,557 | Butler | Oct. 23, 1951 |
| 2,614,080 | Welch | Oct. 14, 1952 |
| 2,651,628 | Welch | Sept. 8, 1953 |

FOREIGN PATENTS

| 640,566 | Great Britain | July 26, 1950 |